(12) United States Patent
Yoon et al.

(10) Patent No.: US 8,904,017 B2
(45) Date of Patent: Dec. 2, 2014

(54) MOBILE DEVICE AND CONTROL METHOD THEREOF

(75) Inventors: Jong-hyun Yoon, Seoul (KR); Sang-su Nam, Seoul (KR); Jae-min Ahn, Seoul (KR); Dae-sung Cho, Suwon-si (KR); Hyun-gyoo Yook, Seoul (KR)

(73) Assignee: Sansung Electronics Co., Ltd., Suwon-si (KR)

( * ) Notice: Subject to any disclaimer, the term of this patent is extended or adjusted under 35 U.S.C. 154(b) by 248 days.

(21) Appl. No.: 12/958,007

(22) Filed: Dec. 1, 2010

(65) Prior Publication Data

US 2011/0131337 A1 Jun. 2, 2011

Related U.S. Application Data

(60) Provisional application No. 61/265,923, filed on Dec. 2, 2009, provisional application No. 61/265,939, filed on Dec. 2, 2009.

(30) Foreign Application Priority Data

Nov. 22, 2010 (KR) .................. 10-2010-0116091

(51) Int. Cl.
*G06F 15/16* (2006.01)
*H04M 1/725* (2006.01)
*H04W 88/02* (2009.01)

(52) U.S. Cl.
CPC .......... *H04M 1/72583* (2013.01); *H04W 88/02* (2013.01)
USPC .......................................... 709/228; 709/220

(58) Field of Classification Search
None
See application file for complete search history.

(56) References Cited

U.S. PATENT DOCUMENTS

| 6,175,789 | B1 | 1/2001 | Beckert et al. |
| 6,757,269 | B2 * | 6/2004 | Dorenbosch et al. ......... 370/338 |
| 6,775,267 | B1 * | 8/2004 | Kung et al. .................... 370/352 |
| 7,672,695 | B1 * | 3/2010 | Rainnie et al. ............... 455/574 |
| 8,516,096 | B2 * | 8/2013 | LeBlanc et al. .............. 709/223 |
| 2003/0100308 | A1 * | 5/2003 | Rusch ........................... 455/445 |
| 2004/0097228 | A1 * | 5/2004 | Saada ....................... 455/432.1 |
| 2004/0233930 | A1 * | 11/2004 | Colby, Jr. ...................... 370/464 |
| 2004/0264402 | A9 * | 12/2004 | Whitmore et al. ............ 370/328 |
| 2005/0060425 | A1 * | 3/2005 | Yeh et al. ...................... 709/232 |
| 2005/0090292 | A1 * | 4/2005 | Yasutake ....................... 455/567 |

(Continued)

FOREIGN PATENT DOCUMENTS

CN 101325769 A 12/2008
CN 1 01 388819 A 3/2009

(Continued)

OTHER PUBLICATIONS

International Search Report [PCT/ISA/210] issued by the International Searching Authority in International Application No. PCT/KR2010/008602 on Aug. 23, 2011.

(Continued)

*Primary Examiner* — Ninos Donabed
(74) *Attorney, Agent, or Firm* — Sughrue Mion, PLLC

(57) ABSTRACT

The mobile device includes a communication unit which performs communication through a network; and a control unit which executes an application prepared by an application programming interface (API) of the network function provided by a platform, and controls the communication unit to perform communication in accordance with a setup of a preferred network if the application includes the setup of the preferred network.

13 Claims, 6 Drawing Sheets

(56) References Cited

U.S. PATENT DOCUMENTS

| | | | |
|---|---|---|---|
| 2005/0128968 A1* | 6/2005 | Yang | 370/312 |
| 2005/0195390 A1 | 9/2005 | Jeon et al. | |
| 2005/0228870 A1* | 10/2005 | de Boor et al. | 709/219 |
| 2006/0015636 A1 | 1/2006 | Skraba et al. | |
| 2006/0039335 A1* | 2/2006 | Ono et al. | 370/338 |
| 2006/0126649 A1* | 6/2006 | Akiyoshi | 370/401 |
| 2006/0258353 A1* | 11/2006 | Makela et al. | 455/435.2 |
| 2006/0288329 A1 | 12/2006 | Gandhi et al. | |
| 2007/0004393 A1* | 1/2007 | Forsberg et al. | 455/420 |
| 2007/0011665 A1 | 1/2007 | Gandhi et al. | |
| 2008/0039079 A1* | 2/2008 | Iyer et al. | 455/432.1 |
| 2008/0056212 A1* | 3/2008 | Karaoguz et al. | 370/338 |
| 2008/0109877 A1* | 5/2008 | Park et al. | 726/3 |
| 2008/0160967 A1* | 7/2008 | Narasimhan et al. | 455/414.1 |
| 2008/0299960 A1* | 12/2008 | Lockhart et al. | 455/418 |
| 2009/0011738 A1* | 1/2009 | Sasakura | 455/410 |
| 2009/0245215 A1* | 10/2009 | Oshime | 370/338 |
| 2009/0254639 A1* | 10/2009 | Manchester et al. | 709/220 |
| 2009/0310509 A1* | 12/2009 | Kumai et al. | 370/254 |
| 2010/0008291 A1* | 1/2010 | LeBlanc et al. | 370/328 |
| 2010/0150001 A1 | 6/2010 | Tsuchiya | |

FOREIGN PATENT DOCUMENTS

| | | |
|---|---|---|
| JP | 200672969 A | 3/2006 |
| JP | 2006074295 A | 3/2006 |
| KR | 10-2006-0058590 A | 5/2006 |
| KR | 10-2006-0076546 A | 7/2006 |
| KR | 10-2007-0095048 A | 9/2007 |
| KR | 10-2009-0121435 A | 11/2009 |
| WO | 2006109159 A2 | 10/2006 |
| WO | 2008032479 A1 | 3/2008 |

OTHER PUBLICATIONS

Communication, dated Jun. 25, 2014, issued by the State Intellectual Property Office of P.R. China in counterpart Patent Application No. 201080054231.0.

Communication, dated Sep. 9, 2014, issued by the Japanese Patent Office in counterpart Patent Application No. 2012-541945.

Communication dated Oct. 9, 2014 issued by the Australian Government IP Australia in counterpart Australian Patent Application No. 2010327451.

* cited by examiner

MOBILE DEVICE AND CONTROL METHOD THEREOF

CROSS-REFERENCE TO RELATED APPLICATIONS

This application claims priority from U.S. Patent Provisional Application Nos. 61/265,923 and 61/265,939, filed Dec. 2, 2009, and Korean Patent Application No. 10-2010-0116091 filed Nov. 22, 2010, in the Korean Intellectual Property Office, the disclosures of which are incorporated herein by reference in their entireties.

BACKGROUND

1. Field

Apparatuses and methods consistent with exemplary embodiments relate to a mobile device and a control method thereof, and more particularly, to a mobile device capable of providing a network function and a control method thereof.

2. Description of the Related Art

A mobile device such as a cellular phone, a smart phone, a tablet personal computer (PC), etc. performs communication through various networks such as third generation (3G), Wi-Fi, etc. Such various networks have their merits and deficiencies regarding connectivity, speed, costs, etc. Thus, it is desirable to selectively use various networks in accordance with purpose or intention.

Meanwhile, an application of a mobile device often uses a network service supported by an operating system (OS), a platform or the like of the mobile device in order to provide a function useful to a user.

However, the OS, the platform, or the like of a related art mobile device does not sufficiently support an application developer to conveniently develop an application in association with the network. Therefore, enhancement of an application developing environment is desirous.

SUMMARY

Exemplary embodiments address at least the above problems and/or disadvantages and other disadvantages not described above. Also, an exemplary embodiment is not required to overcome the disadvantages described above, and an exemplary embodiment may not overcome any of the problems described above.

One or more exemplary embodiments provide a mobile device capable of providing a developing environment in which a preferred network can be more easily set up, and a control method thereof.

According to an aspect of an exemplary embodiment, there is provided a mobile device providing a network function, the mobile device including a display unit which displays an image; a user input unit which receives an input of a user; a communication unit which performs communication through a network; and a control unit which executes an application prepared by an application programming interface (API) of the network function provided by a platform, and controls the communication unit to perform communication in accordance with setup of a preferred network if the application includes the setup of the preferred network.

The platform may define a plurality of operation modes related to the preferred network, the application may include setup of a variable representing one of the plurality of operation modes, and the control unit may control the communication unit to operate in the operation mode corresponding to the setup of the variable.

The plurality of operation modes may include use of Wi-Fi first, use of only a packet switched (PS) domain, and use of only Wi-Fi.

A network connection by the platform may include a default network connection where the application does not specify the network connection, and a custom network connection where the application is enabled to directly control the network, and the control unit may control the communication unit to perform communication in accordance with the setup of the preferred network in the case of the default network connection.

According to another aspect of an exemplary embodiment, there is provided a control method of a mobile device providing a network function, the control method including executing an application prepared by an API provided by a platform of the mobile device; and performing communication in accordance with setup of a preferred network if the application includes the setup of the preferred network.

The platform may define a plurality of operation modes related to the preferred network, the application may include setup of a variable representing one of the plurality of operation modes, and the performing the communication may include performing communication to operate in the operation mode corresponding to the setup of the variable.

The plurality of operation modes may include use of Wi-Fi first, use of only a PS domain, and use of only Wi-Fi.

A network connection by the platform may include a default network connection where the application does not specify the network connection, and a custom network connection where the application is enabled to directly control the network, and the performing the communication may include performing the communication in accordance with the setup of the preferred network in the case of the default network connection.

BRIEF DESCRIPTION OF THE DRAWINGS

The above and/or other aspects will become more apparent from the following description of exemplary embodiments, taken in conjunction with the accompanying drawings, in which.

DETAILED DESCRIPTION OF EXEMPLARY EMBODIMENTS

Figure 1:
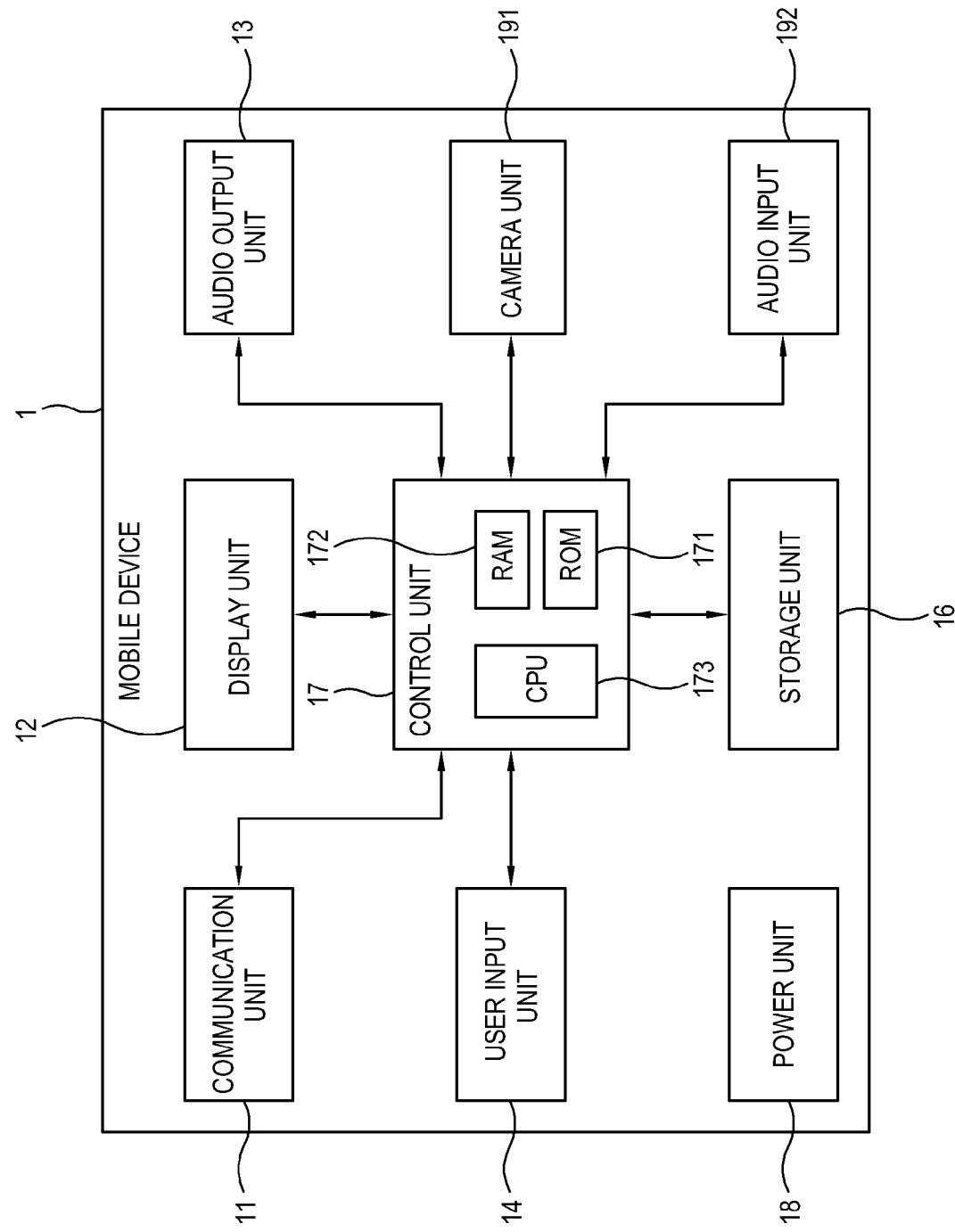
FIG. 1 is a block diagram showing a configuration of a mobile device according to an exemplary embodiment.

Certain exemplary embodiments are described in greater detail below with reference to accompanying drawings.

In the following description, like drawing reference numerals are used for like elements, even in different drawings. The matters defined in the description, such as detailed construction and elements, are provided to assist in a comprehensive understanding of exemplary embodiments. However, exemplary embodiments can be practiced without those specifically defined matters.

FIG. 1 is a block diagram showing a configuration of a mobile device according to an exemplary embodiment. The mobile device 1 shown in FIG. 1 may include, for example, a cellular phone, a smart phone, a tablet personal computer (PC), etc. The mobile device 1 may include a communication unit 11, a display unit 12, an audio output unit 13, a user input unit 14, a storage unit 16, a control unit 17, a power unit 18, a camera unit 191, and an audio input unit 192.

The communication unit 11 performs communication through a network. The contents and type of the communication performed by the communication unit 11 may vary depending on use and function of the mobile device 1. For example, in the case of a telephone function, the communication unit 11 calls the other device (not shown) for telephone conversation. In this exemplary embodiment, the calling type includes 3G. In the case of an Internet function, the communication unit 11 performs Internet connection with a predetermined server (not shown) for transmitting/receiving data. Further, the communication unit 11 may perform communication with a peripheral device (not shown) through local communication such as Bluetooth, WiFi, etc. The communication unit 11 performs the communication under control of the control unit 17.

The display unit 12 displays an image representing the operation or state of the mobile device 1. The display unit 12 may display an image by using various display devices including, for example, a liquid crystal display (LCD), an organic light emitting device (OLED), etc. The audio output unit 13 outputs an audio representing the operation or state of the mobile device 1. The audio output unit 13 may include an audio processor (not shown) that processes an audio signal, and a loudspeaker (not shown) that outputs an audio based on an audio signal.

The user input unit 14 receives a user's command. The user input unit 14 may receive a user's command in various forms, which may include a key input unit (not shown) that receives a user's command by a key input, and a touch input unit (not shown) that receives a user's command by a touch input. A touch input unit may include a touch screen provided in the display unit 12.

The storage unit 16 is a non-volatile memory including, for example, a flash memory, a hard disk drive, etc., which stores data or programs for operating the mobile device 1. The power unit 18 supplies power for operating the mobile device 1. The camera unit 191 takes an image, and the audio input unit 192 may include a microphone or the like and receives an audio. Some of the above-described elements, for example, the camera unit 191, or the like may be omitted from the mobile device 1 in consideration of its function or use.

Figure 2:
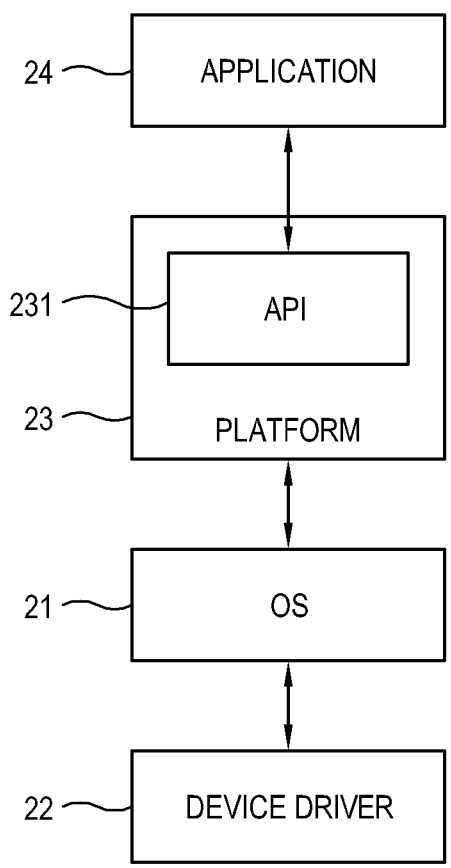
FIG. 2 is a block diagram showing a software configuration of the mobile device of FIG. 1.

The control unit 17 controls the operation of the elements in the mobile device 1. The control unit 17 may include a read only memory (ROM) 171 where a control program for performing an operation is stored, a random access memory (RAM) 172 where the control program is at least partially loaded, and a central processing unit (CPU) 173 which executes the loaded control program. The control program of the control unit 17 may be stored in the storage unit 16 as well as in the ROM 171. The control program of the control unit 17 may include a plurality of programs. FIG. 2 is a block diagram showing an exemplary configuration of the control program in the control unit 17.

As shown in FIG. 2, the control program of the control unit 17 may include an OS 21, a device driver 22, a platform 23, and an application 24. The OS 21 manages and controls overall operations of the mobile device 1. The device driver 22 performs an interface between a hardware device such as the communication unit 16 and the OS 21. The platform 23 performs an interface between the OS 21 and the application 24, and includes an API 231 for supporting the application 24.

The application 24 performs at least one function, and may be prepared using the API 231 of the platform 23. The function performed by the application 24 includes a network function. The application 24 may be transmitted from the external device through the communication unit 11 and installed on the mobile device 1. That is, a user can download the application 24 via the Internet or the like and install it on the mobile device 1.

The API 231 of the platform 23 includes an API for the network function which is also referred to as a network service. For example, a network connection representing an actual run-time session is initially established for transmitting and receiving data through a network using the platform 23. To set up the network connection, a network account may be used. The network account encapsulates configuration parameters such as a protocol type, an access point name, a local Internet protocol (IP) address, a domain name system (DNS) address, authentication information, etc. After the network connection is successfully established, a data communication protocol such as a hyper text transfer protocol (HTTP), socket methods, etc. may be applied.

Figure 3:
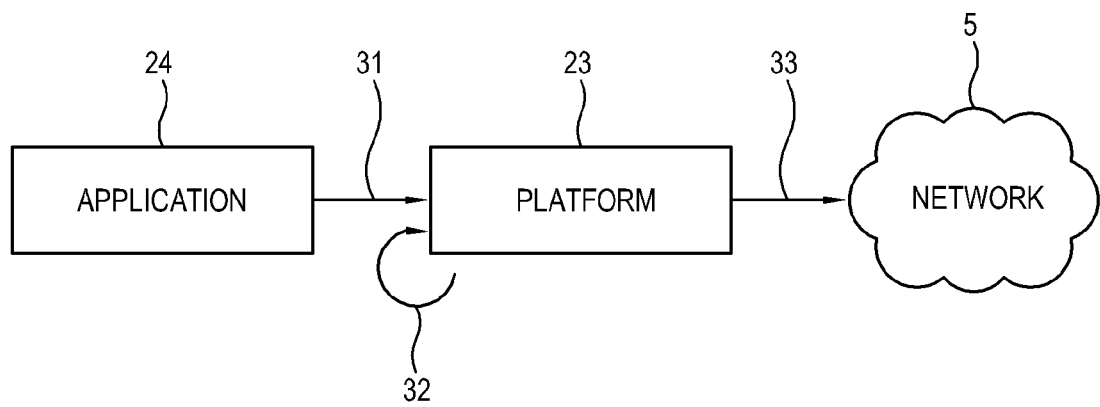
FIGS. 3 and 4 show network connection types of the mobile device according to an exemplary embodiment.
Figure 4:
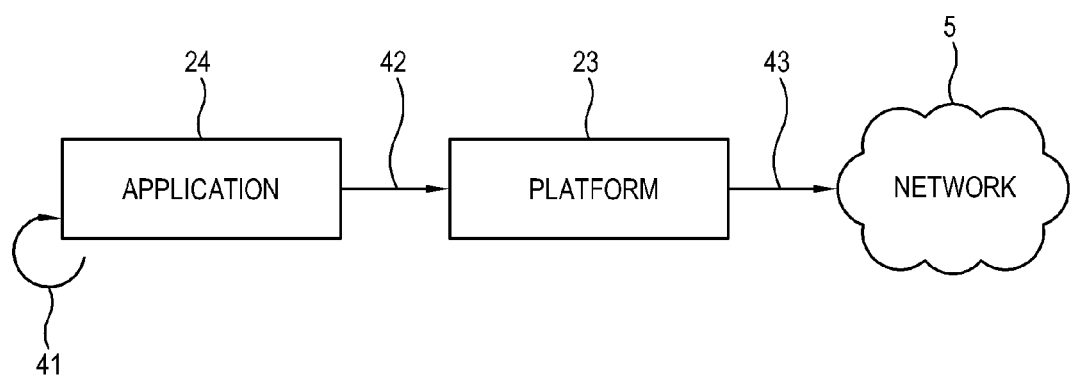

FIGS. 3 and 4 show network connection types of the mobile device according to an exemplary embodiment. FIG. 3 shows a default network connection, and FIG. 4 shows a custom network connection.

Referring to FIG. 3, the application 24 requests a network service of the platform 23 without a network connection via a request 31. The network service (e.g., HTTP, socket methods, etc.) internally starts the default network connection in accordance with a preset default (as indicated by a reference numeral 32. Next, the network service of the platform 23 accesses a network 5 via a connection 33.

The default network connection shown in FIG. 3 is established because the application 24 does not specify the network connection, and therefore usage of the network is simplified in view of the application developer. Also, the platform 23 is allowed to fully manage the network connection. Thus, the application developers can easily and simply develop the application 24 even though they do not know complicated contents of the API 231.

Referring to FIG. 4, the application 24 creates the custom network connection and starts it as indicated by a reference numeral 41. Program 1 shows an example of the application 24 that creates and starts a custom network connection.

---

Program 1

```
// start the NetConnection
    using namespace Osp::Net;
    void
    Test(void)
    {
        // Account ID
        NetAccountId accountId = INVALID_HANDLE;
        result r = E_SUCCESS;
        // Account manager
        NetAccountManager netAccountManager;
        r = netAccountManager.Construct( );
        accountId =
netAccountManager.GetNetAccountId( );
        // Construct a Listener
        TestListener* pMyListener = new TestListener( );
        // NetConnection instance allocation
        NetConnection* pNetConnection = new
NetConnection;
        // NetConnection Construction
        r = pNetConnection->Construct(accountId);
        // _NetConnectionEvent AddListener
        r = pNetConnection-
```

-continued

Program 1

```
>AddNetConnectionListener(pMyListener);
        // NetConnection connect
        r = pNetConnection->Start( );
}
```

Referring back to FIG. 4, the application 24 requests a network service of the platform 23 with a network connection via a request 42. Next, the network service of the platform 23 accesses the network 5 via a connection 43.

The custom network connection described with reference to FIG. 4 may be for an advanced developer, and enables the application 24 to directly control the network 5. Thus, the application 24 can use a specific network account, and start or stop the network connection at any time. That is, the application developer is allowed to develop the application 24 that provides a more enhanced function.

Figure 5:
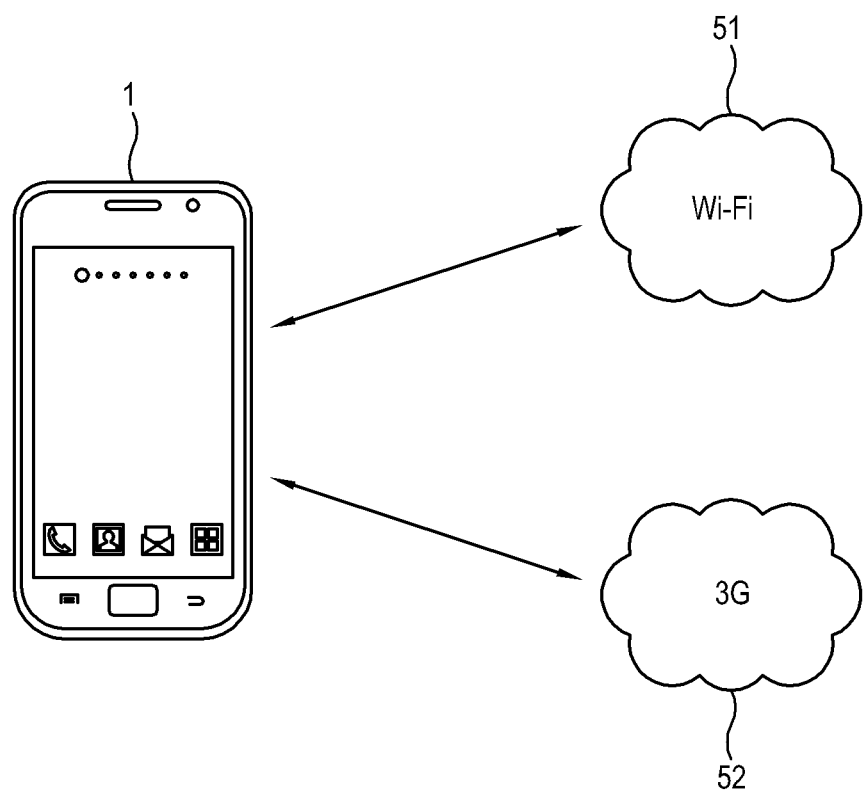
FIG. 5 is a view for explaining a preferred network of the mobile device according to an exemplary embodiment.

The control unit 17 of an exemplary embodiment may enable the developer to perform communication with a desired network which may be referred to as a preferred network in accordance with a setup of the application 24. FIG. 5 is a view for explaining a preferred network of the mobile device in this exemplary embodiment. The preferred network in this exemplary embodiment includes Wi-Fi 51 and 3G 52. The 3G is an example of a PS domain. The control unit 17 may be connected to one of the preferred networks, i.e., the Wi-Fi 51 and the 3G 52 in accordance with the setup of the application 24.

The API 231 of the platform 23 defines a plurality of operation modes related to the preferred network. The application 24 includes setup of variables that represents one of the operation modes defined by the API 231 of the platform 23. Table 1 shows an example of variables corresponding to the operation modes related to the preferred network of the present exemplary embodiment, and Program 2 shows an example of the application 24 that sets up the preferred network. The platform 23 accomplishes connection to one preferred network between the Wi-Fi 51 and the 3G 52 with reference to the variables set up in the application 24.

TABLE 1

| Variables | Operation modes |
|---|---|
| NET_WIFI_FIRST | Use of WI-FI first |
| NET_PS_ONLY | Use of only PS domain |
| NET_WIFI_ONLY | Use of only Wi-Fi |

PROGRAM 2

Net::NetAccountManager::Construct( )
Net::NetAccountManager::SetNetPreference(NET_PS_ONLY)

In this exemplary embodiment, the platform 23 provides the foregoing simple API 231 in association with the preferred network, so that the application developer can readily perform the setup related to the preferred network by simply selecting the given variable of the API 231. Also, the setup of the preferred network may be applied to the default network connection described with reference to FIG. 3. In other words, although the application developer does not completely know the API 231 to accomplish the custom network connection described with reference to FIG. 4, the developer is enabled to set up the preferred network even when the default network connection is used. Accordingly, there is provided an environment for more easily developing the application 24.

Figure 6:
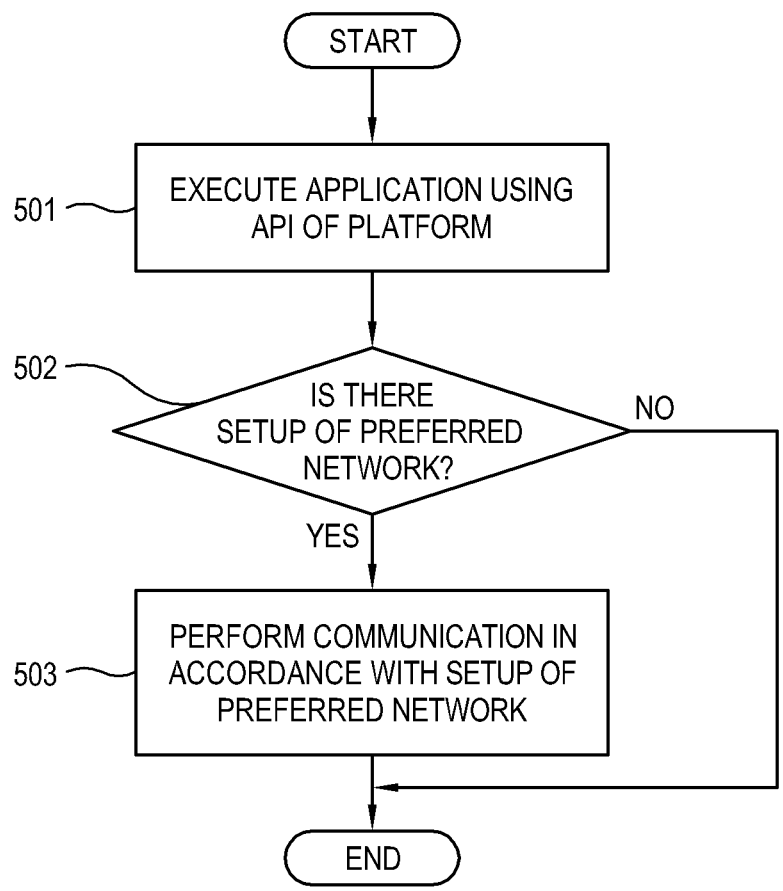
FIG. 6 is a flowchart showing an operation of the mobile device according to an exemplary embodiment.

FIG. 6 is a flowchart showing an operation of the mobile device according to an exemplary embodiment. At operation 501, the application 24 using the API 231 of the platform is executed. At operation 502, it is ascertained whether the application 24 includes setup related to the preferred network. If the application 24 includes the setup related to the preferred network, at operation 503 the communication is performed in accordance with the setup of the preferred network.

As described above, there is provided a developing environment in which a preferred network can be more easily set up.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A mobile device for providing a network function, the mobile device comprising:
a communication unit which is implemented by a processor and performs communication through a network; and
a controller which executes an application prepared by an application programming interface (API) of the network function provided by a platform,
wherein the network function comprises a network service,
the application comprises one of a first application which is an executable application and does not specify a network connection and a second application which is an executable application, specifies the network connection and requests the network service of the platform with the network connection,
the controller controls the communication unit to establish a first network connection based on a preset default of the platform in response to the first application being prepared by the API and executed, and to establish a second network connection controlled by the second application in response to the second application being prepared by the API and executed, and
wherein the second application creates and starts a custom network connection, and then requests the network service of the platform with the custom network connection, via a first request in which the network connection is specified, and
the platform accesses the network in response to the first request based on the custom network connection.

2. The mobile device according to claim 1, wherein:
the platform defines a plurality of operation modes related to a preferred network,
the application sets up one of the plurality of operation modes, and
the controller controls the communication unit to operate in the operation mode corresponding to the one of the plurality of operation modes.

3. The mobile device according to claim 2, wherein the plurality of operation modes comprises at least one of:
a use of Wi-Fi first,
a use of only a packet switched (PS) domain, and
a use of only Wi-Fi.

4. The mobile device according to claim 1, wherein the second application is enabled to directly control the network.

5. A control method for a mobile device, the control method comprising:
- executing an application prepared by an application programming interface (API) provided by a platform of the mobile device, the application comprising one of a first application which is an executable application and does not specify a network connection and a second application which is an executable application, specifies the network connection and requests a network service of the platform with the network connection; and
- establishing a first network connection based on a preset default of the platform in response to the first application being prepared by the API and executed and establishing a second network connection controlled by the second application in response to the second application being prepared by the API and executed,
- wherein the second application creates and starts a custom network connection, and then requests the network service of the platform with the custom network connection, via a request in which the network connection is specified, and
- the platform accesses the network in response to the request based on the custom network connection.

6. The control method according to claim 5, further comprising performing communication to operate in one of a plurality of operation modes related to a preferred network,
- wherein the platform defines the plurality of operation modes,
- the application sets up one of the plurality of operation modes, and
- the performing the communication comprises performing communication to operate in the operation mode corresponding to the one of the plurality of operation modes.

7. The control method according to claim 6, wherein the plurality of operation modes comprises at least one of:
- a use of Wi-Fi first,
- a use of only a packet switched (PS) domain, and
- a use of only Wi-Fi.

8. The control method according to claim 5, wherein the second application is enabled to directly control the network.

9. The mobile device according to claim 1, further comprising:
- a display which displays an image; and
- a user input device which receives an input of a user.

10. The mobile device according to claim 1, wherein the first application requests a network service of the platform via a second request in which the network connection is not specified and the platform internally starts the first network connection in response to the second request based on pre-stored default network settings.

11. The mobile device according to claim 1, wherein the first application requests the network service of the platform without a previous network connection, via a second request in which the network connection is not specified, and
- the platform internally starts the first network connection in response to the second request based on pre-stored default network settings.

12. The mobile device according to claim 1, wherein the API includes variables which respectively define operation modes comprising:
- a mode to provide a Wi-Fi service first,
- a mode to provide only a packet switched (PS) domain service, and
- a mode to provide only Wi-Fi service; and
- wherein one of the operation modes is set up in response to receiving a selection of one of the variables, to execute the second network connection.

13. The mobile device according to claim 1, wherein the selection of the one of the variables is provided by a user input.

* * * * *